US012585066B2

(12) United States Patent
Lin et al.

(10) Patent No.: US 12,585,066 B2
(45) Date of Patent: Mar. 24, 2026

(54) OPTICAL NETWORK DEVICE AND METHOD FOR PACKAGING OPTICAL NETWORK DEVICE

(71) Applicant: AuthenX Inc., Hsinchu County (TW)

(72) Inventors: Sheng-Fu Lin, Hsinchu County (TW); Po-Kuan Shen, Hsinchu County (TW); Chun-Chiang Yen, Hsinchu County (TW); Yi-Ting Lu, Hsinchu County (TW); Jun-Rong Chen, Hsinchu County (TW); Jenq-Yang Chang, Hsinchu County (TW); Mao-Jen Wu, Hsinchu County (TW)

( * ) Notice: Subject to any disclaimer, the term of this patent is extended or adjusted under 35 U.S.C. 154(b) by 375 days.

(21) Appl. No.: 18/304,375

(22) Filed: Apr. 21, 2023

(65) Prior Publication Data

US 2023/0341630 A1 Oct. 26, 2023

Related U.S. Application Data

(60) Provisional application No. 63/406,669, filed on Sep. 14, 2022, provisional application No. 63/333,931, filed on Apr. 22, 2022.

(51) Int. Cl.
G02B 6/30 (2006.01)

(52) U.S. Cl.
CPC ...................................... G02B 6/30 (2013.01)

(58) Field of Classification Search
CPC .... G02B 6/30; G02B 6/29332; G02B 6/4246; G02B 6/12007; H04B 10/25; H04B 10/40; H04B 10/505; H04J 14/02
See application file for complete search history.

(56) References Cited

U.S. PATENT DOCUMENTS

| | | | |
|---|---|---|---|
| 7,194,166 B1 | 3/2007 | Gunn, III | |
| 10,185,092 B1 | 1/2019 | Bian et al. | |
| 10,436,990 B2 | 10/2019 | Bruck et al. | |
| 10,627,575 B2 | 4/2020 | Bruck et al. | |
| 11,119,280 B2 | 9/2021 | Kuo et al. | |
| 11,187,854 B2 | 11/2021 | Schubert et al. | |
| 11,313,682 B1 | 4/2022 | Hung | |
| 11,428,870 B2 | 8/2022 | Kuo et al. | |
| 11,474,294 B2 | 10/2022 | Hammond et al. | |
| 11,501,053 B2 | 11/2022 | Adolf et al. | |
| 11,531,173 B2 | 12/2022 | Chern et al. | |
| 2010/0119229 A1* | 5/2010 | Roelkens ........... | G02B 6/12007 |
| | | | 398/79 |

(Continued)

*Primary Examiner* — Michael P Mooney

(57) ABSTRACT

An optical network device includes a substrate, a photonic integrated circuit, a fiber, and a packaging cap. Photonic integrated circuit is disposed on substrate. Fiber is configured to receive a first optical signal and transmit a second optical signal. A first wavelength of first optical signal is different from a second wavelength of second optical signal. Packaging cap is configured to combine fiber with substrate, and is configured to cover photonic integrated circuit and fix fiber, so as to align fiber with photonic integrated circuit, so that an oblique angle is formed between a normal vector of a plane where photonic integrated circuit is located and a direction in which fiber extends. Photonic integrated circuit is configured to receive second optical signal according to oblique angle. Photonic integrated circuit is configured to couple first optical signal to fiber according to oblique angle.

18 Claims, 9 Drawing Sheets

(56) References Cited

U.S. PATENT DOCUMENTS

| 2010/0178053 | A1 | 7/2010 | Sagawa et al. |
| 2012/0251122 | A1 | 10/2012 | Grobe et al. |
| 2016/0047990 | A1* | 2/2016 | Zine-El-Abidine ......................... G02B 6/3656 430/311 |
| 2022/0405566 | A1* | 12/2022 | Winterbottom ........ H04B 10/27 |

* cited by examiner

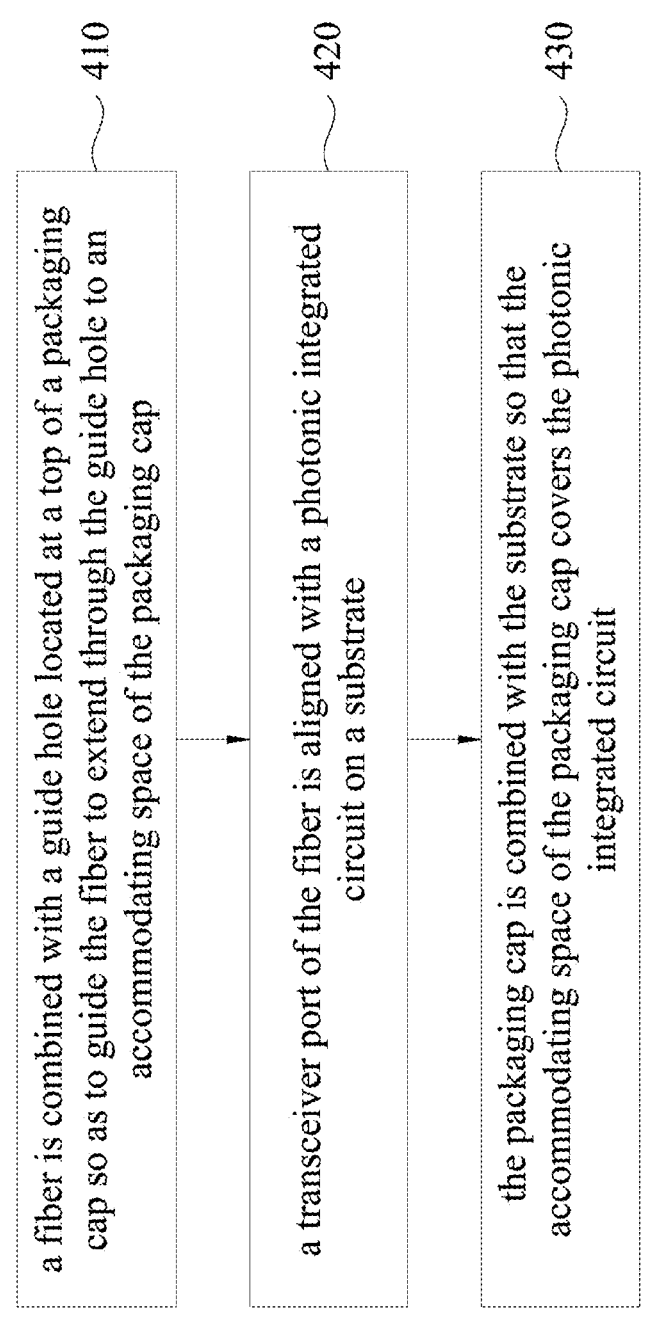

400 a fiber is combined with a guide hole located at a top of a packaging cap so as to guide the fiber to extend through the guide hole to an accommodating space of the packaging cap — 410 a transceiver port of the fiber is aligned with a photonic integrated circuit on a substrate — 420 the packaging cap is combined with the substrate so that the accommodating space of the packaging cap covers the photonic integrated circuit — 430

OPTICAL NETWORK DEVICE AND METHOD FOR PACKAGING OPTICAL NETWORK DEVICE

CROSS-REFERENCE TO RELATED APPLICATION

This application claims priority to U.S. Provisional Application Ser. No. 63/333,931, filed Apr. 22, 2022, and U.S. Provisional Application Ser. No. 63/406,669, filed Sep. 14, 2022, all of which are herein incorporated by reference in their entireties.

BACKGROUND

Field of Invention

The present disclosure relates to a communication device and a method for packaging communication device, an electronic device, and an electronic system. More particularly, the present disclosure relates to an optical network device, and a method for packaging optical network device.

Description of Related Art

Conventional optical network devices have a plurality of traditional mechanical structures, such as screws and ferrules, to fix a transmission optical path of a fiber so that an optical signal transmitted by a fiber is aligned with a photonic integrated circuit (PIC). However, manufacturing cost and time cost of multiple mechanical structures occupy most of cost of an optical network device.

In addition, a coupler structure of a conventional optical fiber network device has poor coupling efficiency for receiving and transmitting optical signals. For the foregoing reason, there is a need to provide a suitable optical network device to solve the problems of the prior art.

SUMMARY

One aspect of the present disclosure provides an optical network device. The optical network device includes a substrate, a photonic integrated circuit, a fiber, and a packaging cap. The photonic integrated circuit is on the substrate. The fiber is configured to receive a first optical signal and transmit a second optical signal. A first wavelength of the first optical signal is different from a second wavelength of the second optical signal. The packaging cap is configured to combine the fiber and the substrate, and is configured to cover the photonic integrated circuit and fix the fiber so as to align the fiber with the photonic integrated circuit, so that an oblique angle is formed between a normal vector of a plane where the photonic integrated circuit is located and a direction in which the fiber extends. The photonic integrated circuit is configured to receive the second optical signal according to the oblique angle. The photonic integrated circuit is configured to couple the first optical signal to the fiber according to the oblique angle.

Another aspect of the present disclosure provides a method for packaging optical network device. The method for packaging optical network device includes the following steps: combining a fiber to a guide hole located at a top of a packaging cap so as to guide the fiber to extend through the guide hole to an accommodating space of the packaging cap; aligning a transceiver port of the fiber with a photonic integrated circuit on a substrate; and combining the packaging cap with the substrate so that the accommodating space of the packaging cap covers the photonic integrated circuit.

In view of the aforementioned shortcomings and deficiencies of the prior art, the present disclosure provides an optical network device and a method for packaging optical network device. By designing an optical network device of the present disclosure, a structural manufacturing cost of an optical network device can be reduced, and a coupling efficiency of a fiber receiving and transmitting optical signals optical signals can be improved.

BRIEF DESCRIPTION OF THE DRAWINGS

The present disclosure can be more fully understood by reading the following detailed description of the embodiment, with reference made to the accompanying drawings as follows:

FIG. 4 depicts a flow chart of a method for packaging optical network device according to some embodiments of the present disclosure;

DETAILED DESCRIPTION

Figure 1:
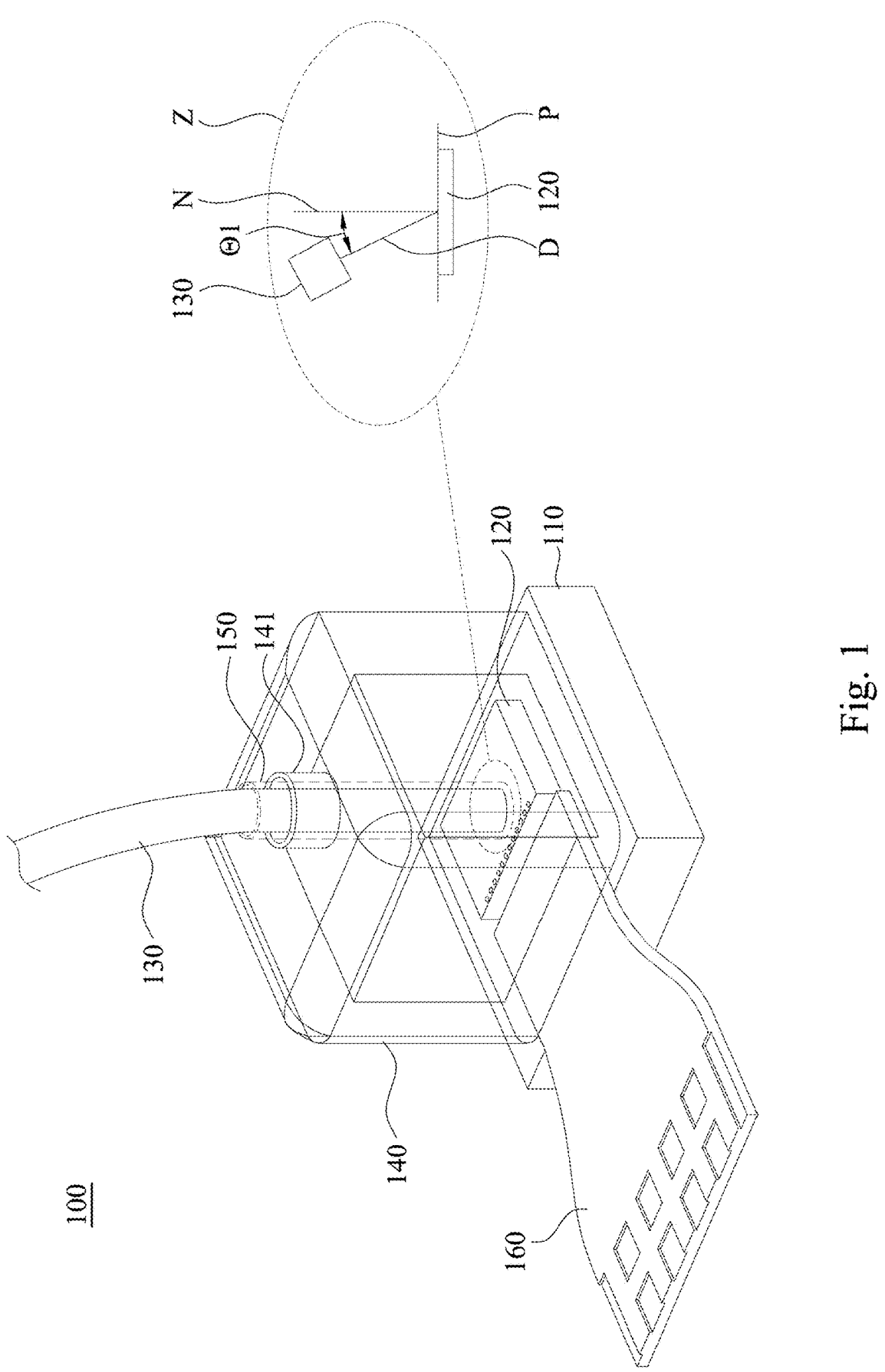
FIG. 1 depicts a schematic diagram of a perspective view of a structure of an optical network device according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of a perspective view of a structure of an optical network device 100 according to some embodiments of the present disclosure. In some embodiments, as shown in FIG. 1, the optical network device 100 includes a substrate 110, a photonic integrated circuit 120, a fiber 130, a packaging cap 140, a ferrule 150, and a printed circuit board 160. The photonic integrated circuit 120 is disposed on the substrate 110. The printed circuit board 160 is coupled to the photonic integrated circuit 120.

In some embodiments, the fiber 130 is configured to receive a first optical signal and transmit a second optical signal. A first wavelength of the first optical signal is different from a second wavelength of the second optical signal. The packaging cap 140 is configured to combine the substrate 110 and the fiber 130, and is configured to cover the photonic integrated circuit 120 and fix the fiber 130 so as to align the fiber 130 with the photonic integrated circuit 120 so that an oblique angle Θ1 is formed between a normal vector N of a plane P where the photonic integrated circuit 120 is located and a direction D in which the fiber 130 extends (as shown in an enlarged diagram of a partial area Z on a right side of the figure). The photonic integrated circuit 120 is configured to receive the second optical signal according to the oblique angle Θ1. The photonic integrated circuit 120 is configured to couple the first optical signal to the fiber 130 according to the oblique angle the oblique angle Θ1.

In some embodiments, the packaging cap 140 includes a guide hole 141. The guide hole 141 is located on a top of the packaging cap 140, and is configured to guide the fiber 130 into an accommodating space of the packaging cap 140 so as to align the fiber 130 with the photonic integrated circuit 120.

In some embodiments, the photonic integrated circuit 120 is further configured to convert the second optical signal into an electrical signal to be transmitted to the printed circuit board 160. The photonic integrated circuit 120 is further configured to convert an electrical signal into the first optical signal to be coupled to the fiber 130.

Figure 2:
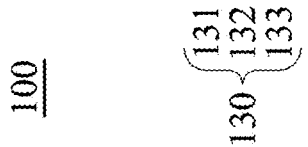
FIG. 2 depicts a schematic diagram of a side perspective view of a structure of an optical network device according to some embodiments of the present disclosure.

FIG. 2 depicts a schematic diagram of a side perspective view of a structure of the optical network device 100 of FIG. 1 according to some embodiments of the present disclosure. In some embodiments, compared with FIG. 1, an embodiment in FIG. 2 is a detailed structure of the optical network device 100. The photonic integrated circuit 120 includes a wavelength division multiplexing coupler 121. The fiber 130 includes a fiber core 131, a fiber housing 132, and a transceiver port 133, rests of structures are the same as the optical network device 100 of FIG. 1, and repetitious details are omitted herein. It should be noted that a shape and a size of each of the packaging cap 140 of the optical network device 100 of FIG. 1 and the packaging cap 140 of the optical network device 100 of FIG. 2 are not limited to embodiment of the present disclosure.

In some embodiments, the wavelength division multiplexing coupler 121 is configured to receive the second optical signal from the transceiver port 133 of the fiber 130 (equal to the extension direction D of the fiber 130) according to the oblique angle Θ1 (as shown in an enlarged diagram of a partial area Z on a left side of the figure), and is configured to couple the first optical signal from the plane P where the photonic integrated circuit 120 is located to the transceiver port 133 of the fiber 130 according to the oblique angle Θ1.

In some embodiments, the fiber core 131 is mainly configured to transmit optical signals. The fiber housing 132 is generally subdivided into a cladding and a jacket (not shown in the figure). The cladding of the fiber housing 132 is configured to cover a peripheral portion of the fiber core 131. The jacket of the fiber housing 132 is further configured to protect a peripheral portion of cladding of the fiber housing 132 to prevent damage to the fiber core 131 and the cladding of the fiber housing 132.

In some embodiments, the ferrule 150 is between the guide hole 141 of the packaging cap 140 and the fiber 130, and is configured to fix the fiber 130 to pass through the guide hole 141 and extend into the accommodating space of the packaging cap 140, so as to align of the fiber 130 with the photonic integrated circuit 120 so that the oblique angle Θ1 is formed between the transceiver port 133 of the fiber 130 and the normal vector N of the plane P where the photonic integrated circuit 120 is located.

In some embodiments, the fiber 130 is configured to fix the transceiver port 133 of the fiber 130 to the photonic integrated circuit 120 by a colloid. The colloid includes an optical glue.

Figure 3:
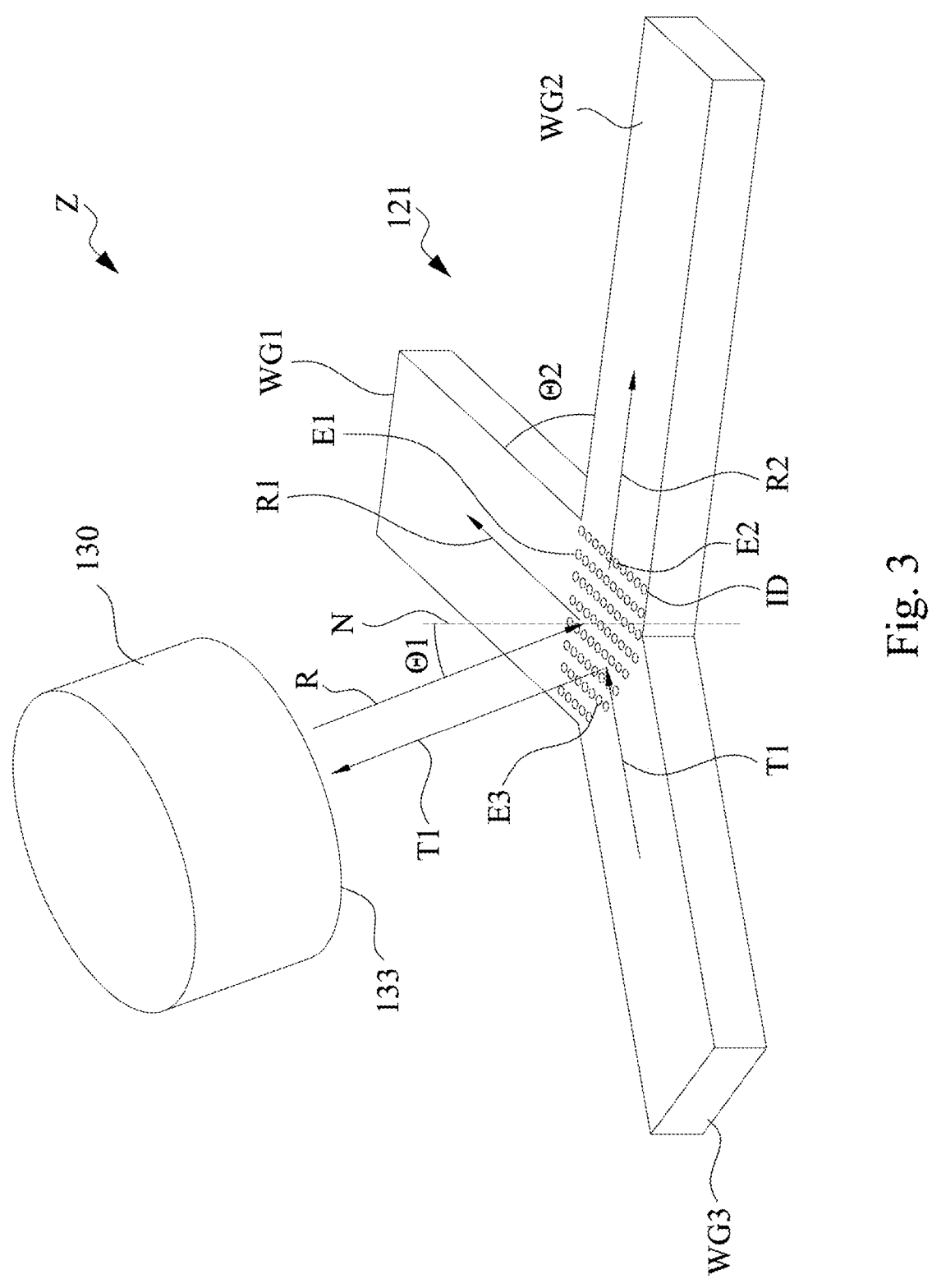
FIG. 3 depicts an enlarged view of partial area of an optical network device according to some embodiments of the present disclosure.

FIG. 3 depicts an enlarged view of a partial area Z of the optical network device 100 of FIG. 1 according to some embodiments of the present disclosure. In some embodiments, in order to facilitate the understanding structures of the optical network device 100, please refer to FIG. 2 and FIG. 3 together. In some embodiments, the wavelength division multiplexing coupler 121 includes an inverse design structure ID, a first output waveguide channel WG1, a second output waveguide channel WG2, and an input waveguide channel WG3. In some embodiments, the first output waveguide channel WG1, the second output waveguide channel WG2, and the input waveguide channel WG3 present a Y-shaped structure. It should be noted that the partial area Z of FIG. 3 is an actual situation of an enlarge view of the partial area Z of FIG. 1 and FIG. 2. A shape and a size of each of the fiber 130 and the wavelength division multiplexing coupler 121 are not limited to embodiment of the present disclosure.

In some embodiments, the inverse design structure ID includes a first end E1, a second end E2, and a third end E3. The first output waveguide channel WG1 is coupled to the first end E1 of the inverse design structure ID. The second output waveguide channel WG2 is coupled to the second end E2 of the inverse design structure ID. The input waveguide channel WG3 is coupled to the third end E3 of the inverse design structure ID. The first end E1, the second end E2, and third end E3 of the inverse design structure ID are not in contact with each other.

It should be noted that, in practice, the transceiver port 133 of the fiber 130 is very close to the inverse design structure ID of the wavelength division multiplexing coupler 121. In some embodiments, a distance between the transceiver port 133 of the fiber 130 and the inverse design structure ID is not limited to embodiment of the present disclosure.

In some embodiments, the inverse design structure ID is configured to receive the second optical signal R according to the oblique angle Θ1, and is configured to split the second optical signal R into a first optical receiving signal R1 and a second optical receiving signal R2. The inverse design structure ID is configured to couple the first optical signal T1 from the plane P where the photonic integrated circuit 120 of FIG. 2 is located to the transceiver port 133 of the fiber 130 according to the oblique angle Θ1. The oblique angle Θ1 is formed between the transceiver port 133 of the fiber

130 and the normal vector N of the plane P where the wavelength division multiplexing coupler 121 of the photonic integrated circuit 120.

In some embodiments, an angle range of the oblique angle is between 0° and 20°. In some embodiments, an angle range of the oblique angle is between 4° and 15°.

In some embodiments, a wavelength range of the first wavelength of the first optical signal T1 is between 1260 nanometers (nm) and 1360 nanometers (nm). A wavelength range of the second wavelength of the second optical signal R is between 1480 nanometers (nm) and 1580 nanometers (nm).

In some embodiments, the best angle of the oblique angle Θ1 is 4°, at this time, the first wavelength of the first optical signal T1 is 1270 nanometers (nm). The second wavelength of second optical signal R is 1577 nanometers (nm).

In some embodiments, the inverse design structure ID is configured to diffract the first optical receiving signal R1 to the first end E1 of the inverse design structure ID. The inverse design structure ID is configured to diffract the second optical receiving signal R2 to the second end E2 of the inverse design structure ID. The inverse design structure ID is configured to receive the first optical signal T1 from the third end E3 from the inverse design structure ID.

It should be noted that, from a macro point of view, Bragg diffraction is performed on the first optical signal T1 and the second optical signal R by a plurality of lattices of the inverse design structure ID of the present disclosure. From a microscopic point of view, the plurality of lattices of inverse design structure ID of the present disclosure is configured to diffract the first optical receiving signal R1 to the first end E1 of the inverse design structure ID to complete a waveguide mode matching of the first optical receiving signal R1, and is configured to diffract the second optical receiving signal R2 to the second end E2 of the inverse design structure ID to complete a waveguide mode matching of the second optical receiving signal R2. In some embodiments, a diffraction result is a complex interference result including constructive interference and destructive interference.

In some embodiments, the first output waveguide channel WG1 is configured to output the first optical receiving signal R1. In some embodiments, the second output waveguide channel WG2 is configured to output the second optical receiving signal R2. In some embodiments, the input waveguide channel WG3 is configured to receive the first optical signal T1.

In some embodiments, an intersection angle Θ2 is formed between the first output waveguide channel WG1 and the second output waveguide channel WG2. In some embodiments, an angle range of the intersection angle Θ2 is between 80° and 110°.

FIG. 4 depicts a flow chart of a method for packaging optical network device 400 according to some embodiments of the present disclosure. In order to facilitate the understanding the method for packaging optical network device 400, please refer to FIG. 1 and FIG. 5A to FIG. 5D. FIG. 5A to FIG. 5D depict a schematic diagram of a structure package of an optical network device 100 according to some embodiments of the present disclosure. In some embodiments, the optical network device method for packaging optical network device 400 uses the packaging cap 140 to combine the substrate 110 with the fiber 130 to form the optical network device 100 as shown in FIG. 1 or the optical network device 100 in FIG. 2.

In step 410, a fiber is combined with a guide hole located at a top of a packaging cap so as to guide the fiber to extend through the guide hole to an accommodating space of the packaging cap.

For example, please refer to FIG. 1 and FIG. 2, the fiber 130 is combined with the guide hole 141 located at a top of a packaging cap 140 so as to guide the fiber 130 to extend through the guide hole 141 to an accommodating space of the packaging cap 140. In some embodiments, please refer to FIG. 5A and FIG. 5C, the fiber 130 extends through the guide hole 141 and passes through the packaging cap body 142. In some embodiments, please refer to FIG. 5A, the sleeve 143 is first combined with the substrate 110 to surround the photonic integrated circuit 120, and then the packaging cap body 142 is combined with the sleeve 143 to form the packaging cap 140.

Figure 5A:
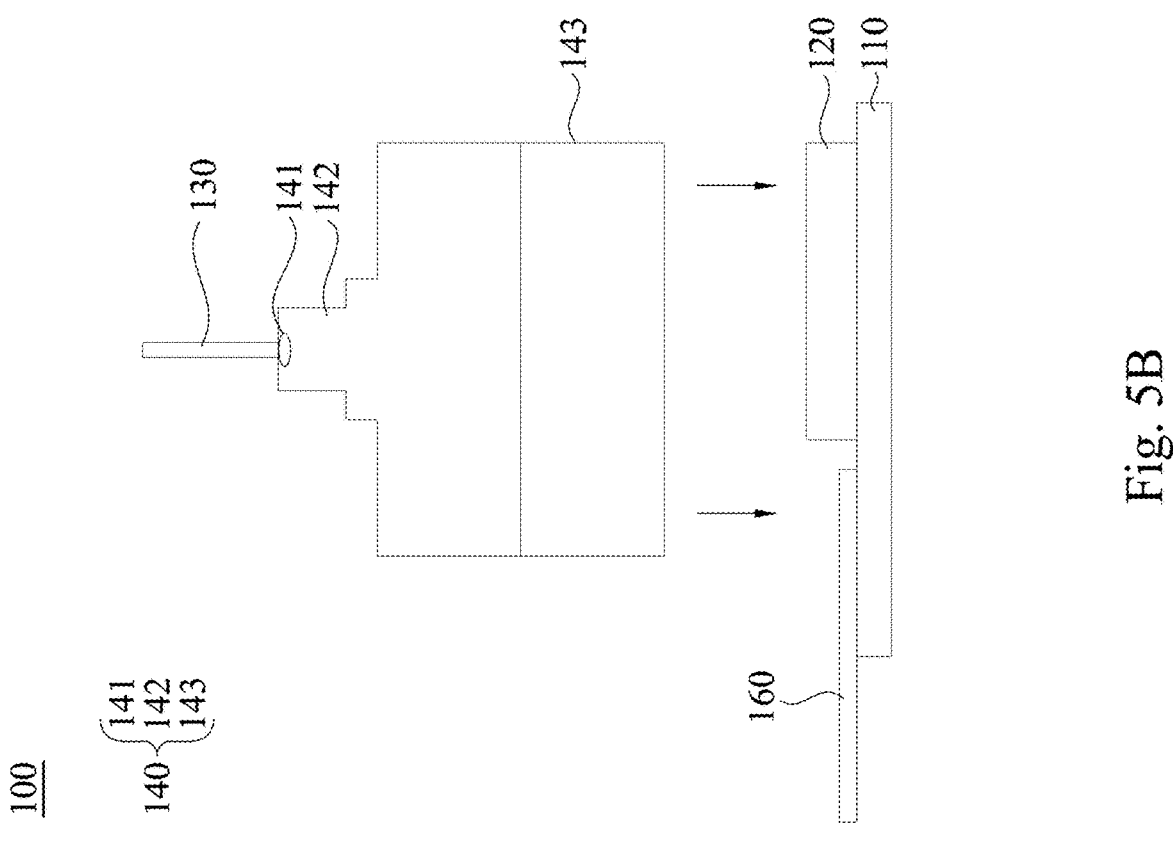
FIG. 5A to FIG. 5D depict a schematic diagram of a structure package of an optical network device according to some embodiments of the present disclosure.
Figure 5B:
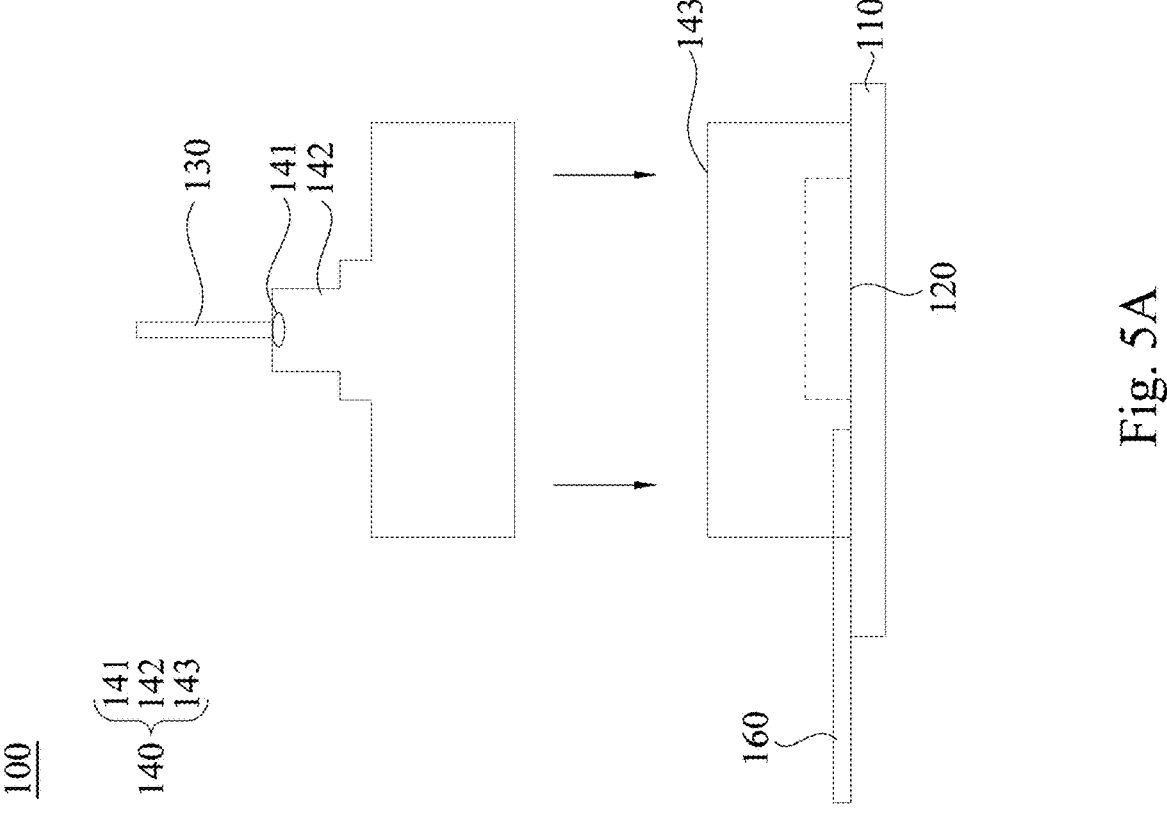

For example, please refer to FIG. 1 and FIG. 5B, the fiber 130 is combined with the guide hole 141 located at a top of a packaging cap 140 so as to guide the fiber 130 to extend through the guide hole 141 to an accommodating space of the packaging cap 140. In some embodiments, please refer to FIG. 5B and FIG. 5C, the packaging cap body 142 is combined with the sleeve 143 to form the packaging cap 140, and then put the packaging cap 140 composed of the packaging cap body 142 and the sleeve 143 on the substrate 110.

In step 420, a transceiver port of the fiber is aligned to a photonic integrated circuit on a substrate.

For example, please refer to FIG. 2, the transceiver port 133 of the fiber 130 is aligned with the photonic integrated circuit 120 on the substrate 110. In some embodiments, the transceiver port 133 of the fiber 130 is aligned with the inverse design structure ID of the wavelength division multiplexing coupler 121 of the photonic integrated circuit 120 on the substrate 110.

Then, please refer to FIG. 2 and FIG. 3, the optical glue and the ferrule 150 are configured to fix the normal vector N of the plane P where the photonic integrated circuit 120 is located and the transceiver port 133 of the fiber 130 to form the oblique angle Θ1, so as to make the wavelength division multiplexing coupler 121 of the photonic integrated circuit 120 to receive and transmit at least one optical signal (e.g., the first optical signal T1 and the second optical signal R) according to the oblique angle Θ1.

In some embodiments, the ferrule 150 is between the guide hole 141 of the packaging cap 140 and the fiber 130. In some embodiments, the ferrule 150 is adapted for the packaging cap 140 (i.e., including the packaging cap body 142 and the sleeve 143). In some embodiments, the ferrule 150 is adapted for packaging cap 140 (i.e., only including packaging cap body 142 and excluding the sleeve 143).

In the step 430, the packaging cap is combined with the substrate so that the accommodating space of the packaging cap covers the photonic integrated circuit.

Figure 5D:
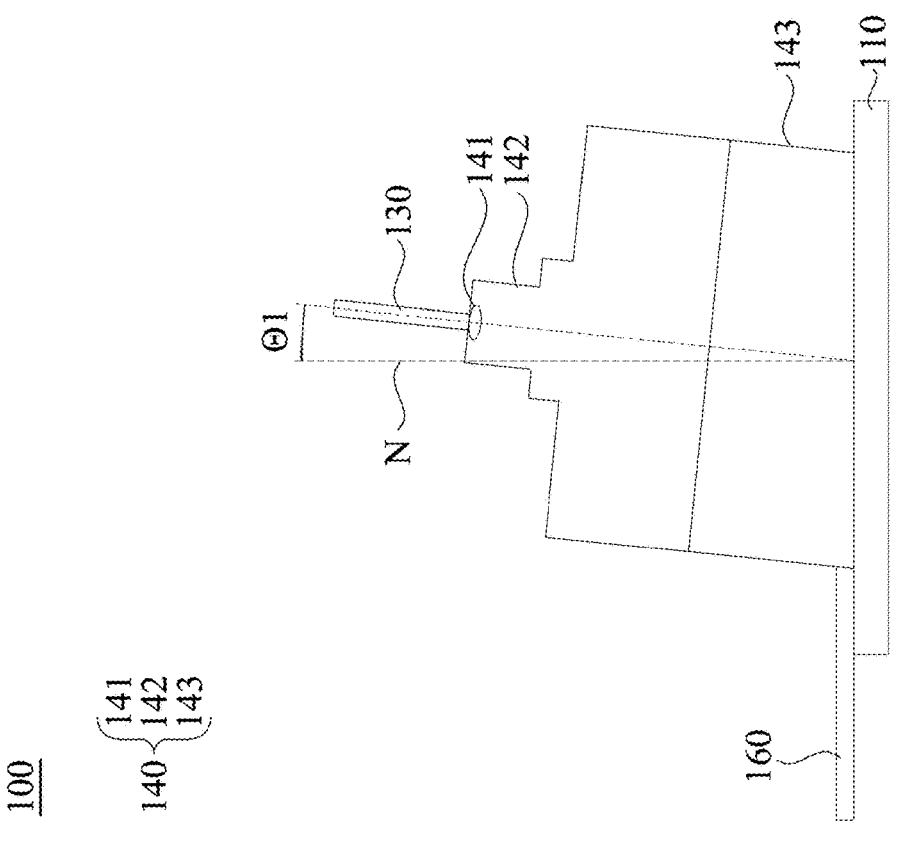
Figure 5C:
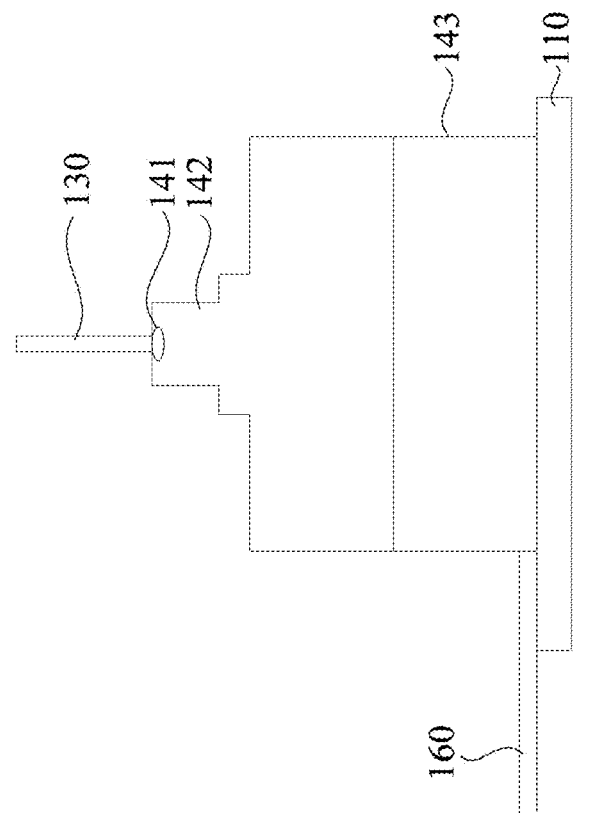

For example, please refer to FIG. 5C, the packaging cap 140 is combined with the substrate 110 so that the accommodating space of the packaging cap 140 covers the photonic integrated circuit 120 as shown in FIG. 1 or photonic integrated circuit 120 as shown in FIG. 2.

For example, please refer to FIG. 5D, compared with the embodiment of FIG. 5C, when combining the packaging cap 140 with the substrate 110, the packaging cap 140 can be directly tilted and packaged, so that the oblique angle Θ1 is formed between the normal vector N of the plane (not shown in the figure) where the photonic integrated circuit (not shown in the figure) is located and a direction (not shown in the figure) in which the fiber 130 extends.

In some embodiments, the packaging cap 140 is combined with the substrate 110 by a welding method. The welding method includes one of a laser welding method and a resistance welding method.

It should be noted that the resistance welding method is defined as a process of permanently connecting two parts by heating two objects in contact with an electric current to melt the two objects at a joint and cool the two objects at the joint. The laser welding method is defined as a process of using a focused laser beam to aim at a joint of two objects that are in contact with each other, and to melt the two objects at the joint in a short time to permanently connect the two parts. Its advantages lie in precise positioning, high speed and small deformation of a welded object.

In some embodiments, please refer to FIG. 5A to FIG. 5D, the packaging cap 140 includes the guide hole 141, the packaging cap body 142, and the sleeve 143. The packaging cap body 142 is configured to connect the fiber 130. The sleeve 143 is configured to connect a bottom of the packaging cap body 142 with the substrate 110. Each of the packaging cap body 142 and the sleeve 143 include metal material, and are configured to fix the fiber 130 and avoid light leakage of the first optical signal and the second optical signal transmitted by the fiber 130 (not shown in the figure).

It should be noted that the aforementioned two combinations are performed in stages, so that the transceiver port 133 of the fiber 130 shown in FIG. 2 is more accurately aligned with wavelength division multiplexing coupler 121 of the photonic integrated circuit 120.

In some embodiments, the sleeve 143 is combined with the substrate 110 by a first welding method. The sleeve 143 is combined with the packaging cap body 142 by a second welding method. In some embodiments, the first welding method includes one of a first laser welding method and a first resistance welding method. The second welding method includes one of a second laser welding method and a second resistance welding method. The first welding method is the same as or is different from the second welding method.

Figure 6:
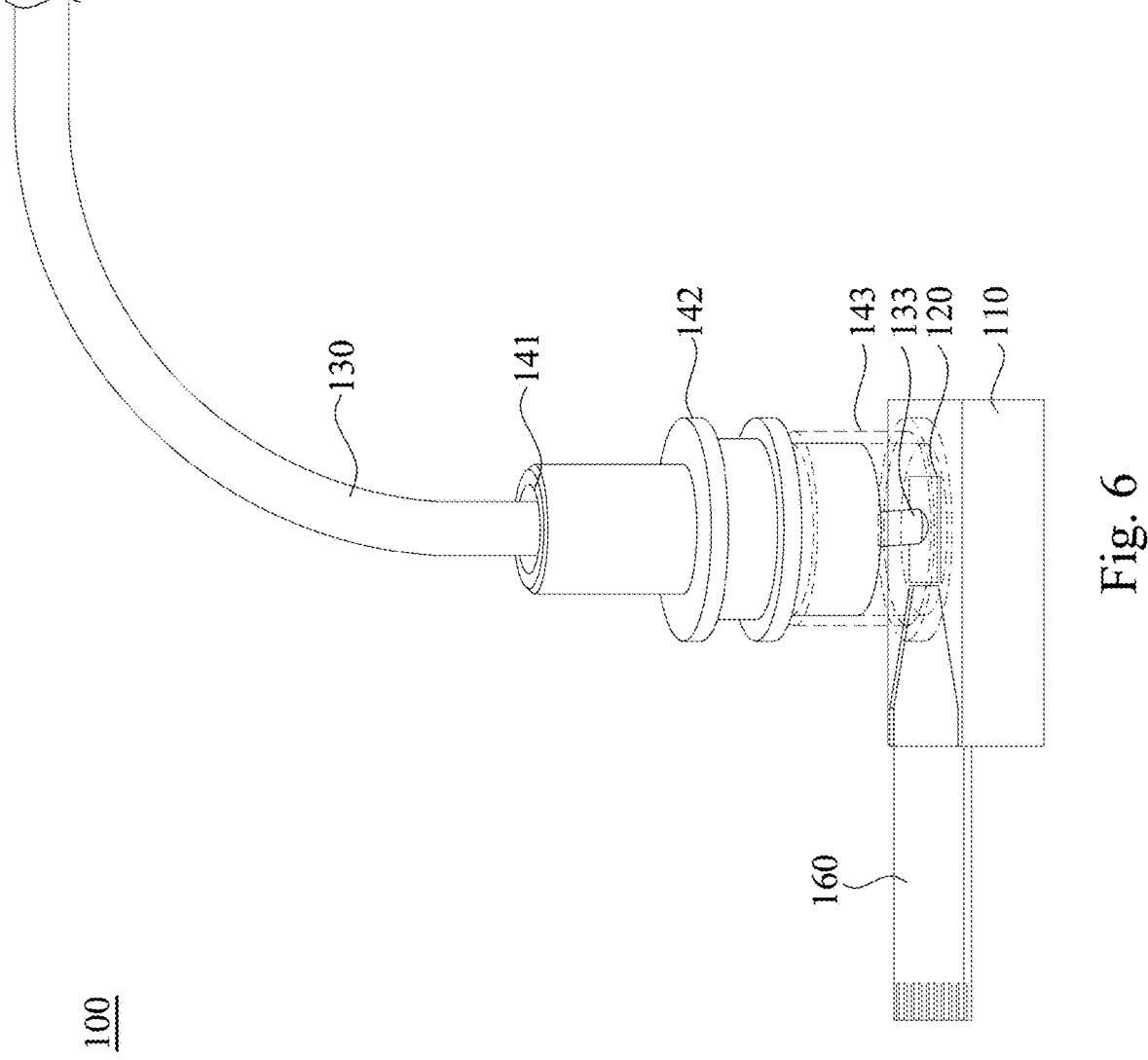
FIG. 6 depicts a schematic diagram of an optical network device according to some embodiments of the present disclosure.

FIG. 6 depicts a schematic diagram of an optical network device 100 according to some embodiments of the present disclosure. The embodiment of FIG. 6 is partial perspective schematic diagram of a combination of the substrate 110, the packaging cap body 142, and the sleeve 143. In FIG. 6, the sleeve 143 is in a perspective state to show the transceiver port 133 of the fiber 130 is aligned with the photonic integrated circuit 120, so as to present the oblique angle Θ1 is formed between the transceiver port 133 of the fiber 130 and the normal vector N of the plane (not shown in the figure) where the photonic integrated circuit 120 is located.

Figure 7:
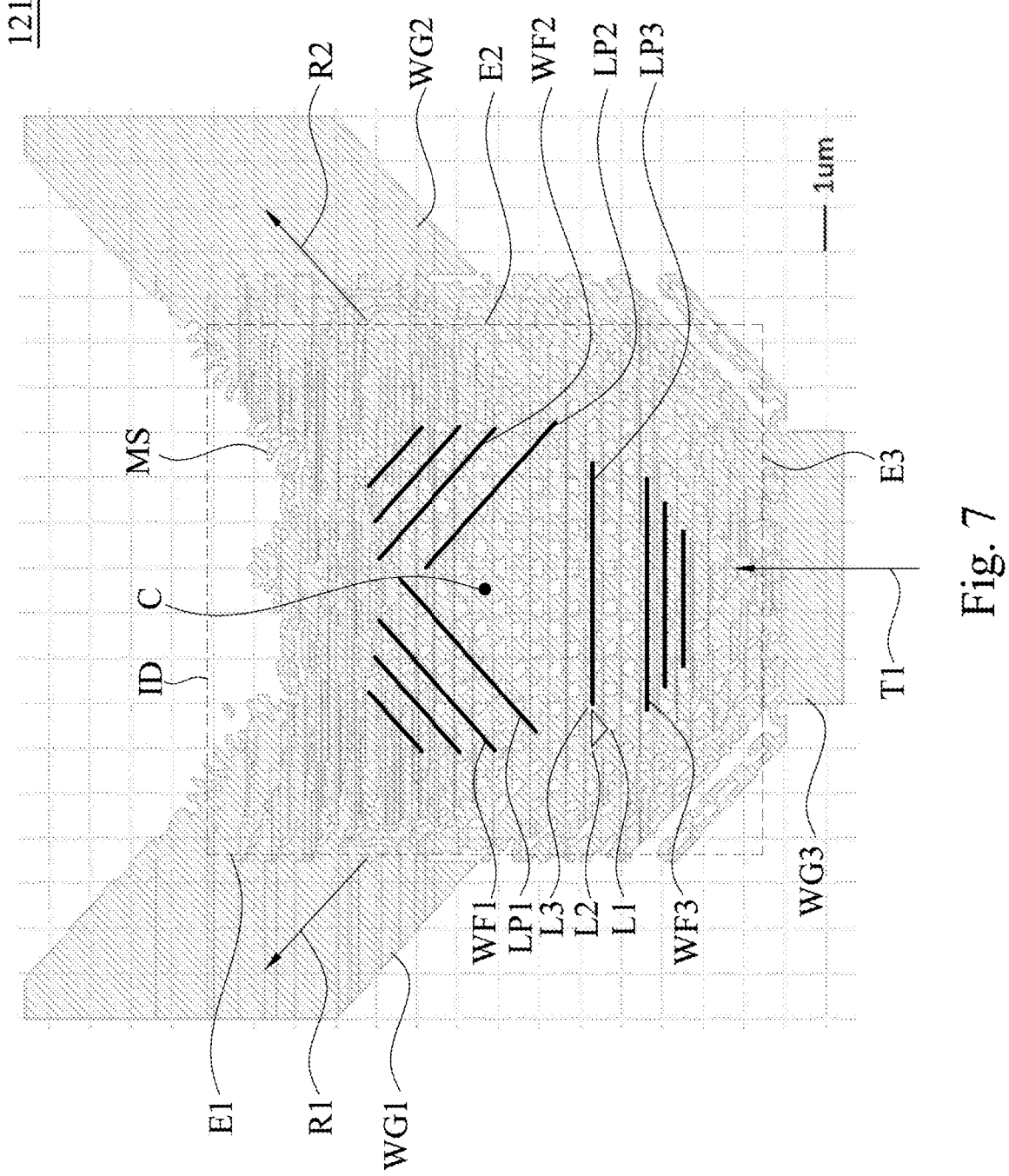
FIG. 7 depicts a schematic diagram of a top view of an inverse design structure of a wavelength division multiplexing coupler of an optical network device according to some embodiments of the present disclosure.

FIG. 7 depicts a schematic diagram of a top view of the inverse design structure ID of the wavelength division multiplexing coupler 121 of FIG. 3 according to some embodiments of the present disclosure. In some embodiments, structures of the wavelength division multiplexing coupler 121 of FIG. 7 is the same as structures of the wavelength division multiplexing coupler 121 of FIG. 3. In some embodiments, the wavelength division multiplexing coupler 121 includes the inverse design structure ID, the first output waveguide channel WG1, the second output waveguide channel WG2, and the input waveguide channel WG3. In some embodiments, the inverse design structure ID includes a center C, a mode transformation structure MS, and a plurality of lattices (e.g., a lattice L1, a lattice L2, and a lattice L3). Inverse design is defined as an interactive relationship between process, structure, properties and performance, in order to achieve a design ability to invert a process and a structure according to a target nature or objective.

In some embodiments, the plurality of lattices of the inverse design structure ID includes a plurality of first lattice planes (e.g., a lattice plane LP1), a plurality of second lattice planes (e.g., a lattice plane LP2), and a plurality of third lattice planes (e.g., a lattice plane LP3). The plurality of first lattice planes (i.e., connection lines of centers of each of the plurality of lattices closed to the first output waveguide channel WG1 have a first directionality) are arranged along a first direction from the center C to the first end E1 with a first plane wave front shape WF1. The plurality of second lattice planes of the inverse design structure ID (connection lines of centers of each of the plurality of lattices closed to the second output waveguide channel WG2 have a second directionality) are arranged along a first direction from the center C to the second end E2 with a second plane wave front shape WF2. The plurality of third lattice planes of the inverse design structure ID (connection lines of centers of each of the plurality of lattices closed to the input waveguide channel WG3 have a third directionality) are arranged along a third direction from the center C to the third end E3 with a third plane wave front shape WF3. In other words, the plurality of lattices are close to each of the first output waveguide channel WG1, the second output waveguide channel WG2, and the input waveguide channel WG3 are roughly arranged as a wavefront of a plane wave.

In some embodiments, a pore diameter of each of the plurality of lattices gradually decreases along the first direction, the second direction, and the third direction respectively. In other words, please refer to FIG. 7, the plurality of lattices from the center C of the inverse design structure ID to the first output waveguide channel WG1, the second output waveguide channel WG2, and the input waveguide channel WG3 gradually become smaller.

In some embodiments, the plurality of lattices are in the shape of a quasi-triangular mesh. For example, the lattice L1, the lattice L2, and the lattice L3 of the inverse design structure ID of the wavelength division multiplexing coupler 121 as shown in FIG. 7 are arranged in a triangle. It should be noted that, the inverse design structure ID is changed according to different wavelengths of the first optical signal T1 and the second optical signal R.

In some embodiments, the inverse design structure ID includes a three-dimensional lattice structure.

In some embodiments, the first wavelength of the first optical signal T1 of the inverse design structure ID in FIG. 7 is 1270 nanometers (nm). The second wavelength of the second optical signal R (i.e., the first optical receiving signal R1 and second optical receiving signal R2) is 1577 nanometers (nm). At this time, please refer to FIG. 3 and FIG. 7, the best oblique angle Θ1 between the normal vector from the center C out of the paper of the inverse design structure ID of FIG. 7 (equivalent to the normal vector N shown in FIG. 3) and the transceiver port 133 of the fiber 130 is 4°.

Figure 8:
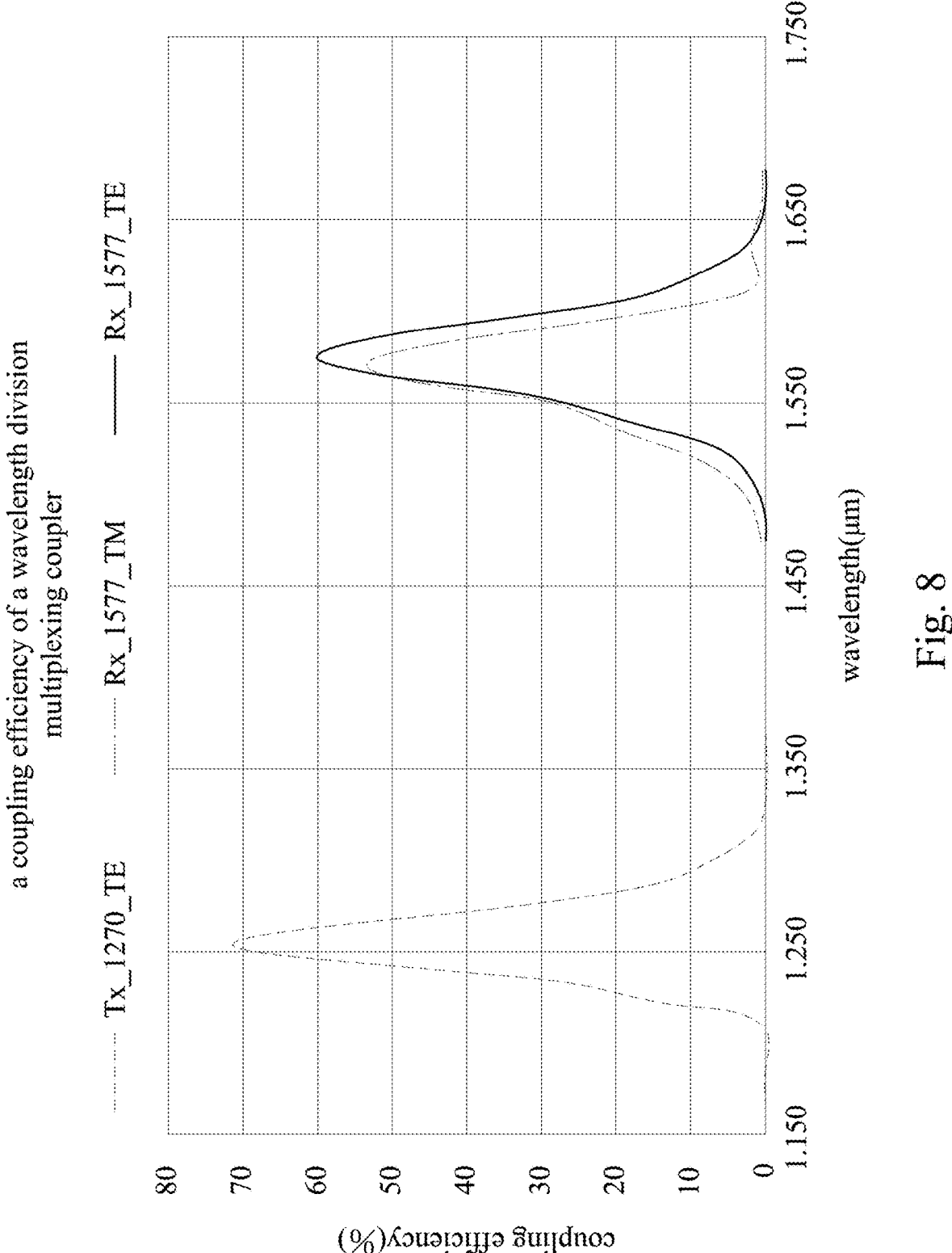
FIG. 8 depicts a schematic diagram of a coupling efficiency of a wavelength division multiplexing coupler and a fiber receiving and transmitting optical signals according to some embodiments of the present disclosure.

FIG. 8 depicts a schematic diagram of a coupling efficiency of the wavelength division multiplexing coupler 121 of FIG. 7 receiving and transmitting optical signals according to some embodiments of the present disclosure. Please refer to FIG. 7 and FIG. 8, a coupling efficiency of the first optical signal T1 of the inverse design structure ID of wavelength division multiplexing coupler 121 of the present disclosure is 74% on average, which is much higher than a coupling efficiency of 16% specified in a physical media-related standards of ITU-T G.987.2 passive optical fiber network.

Then, a coupling efficiency of the second optical signal R of the inverse design structure ID of the wavelength division multiplexing coupler 121 of the present disclosure is 54% on average, which is much higher than a coupling efficiency of 31% specified in a physical media-related standards of ITU-T G.987.2 passive optical fiber network.

Based on the above embodiments, the present disclosure provides an optical network device, and a method for packaging optical network device. Though a design of an optical network device of present disclosure, a structural manufacturing cost of an optical network device can be reduced. Through an inverse design structure of present disclosure, a coupling efficiency of a fiber receiving and transmitting optical signals optical signals can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An optical network device, comprising:
a substrate;
a photonic integrated circuit, comprising a wavelength division multiplexing coupler disposed on the substrate;
a fiber, configured to receive a first optical signal and transmit a second optical signal, wherein a first wavelength of the first optical signal is different from a second wavelength of the second optical signal; and
a packaging cap, configured to combine the fiber with the substrate, and configured to cover the photonic integrated circuit and fix the fiber so as to align the fiber with the photonic integrated circuit so that an oblique angle is formed between a normal vector of a plane where the photonic integrated circuit is located and a direction in which the fiber extends, wherein the photonic integrated circuit is configured to receive the second optical signal according to the oblique angle, and configured to split the second optical signal into a first optical receiving signal and a second optical receiving signal by an inverse design structure of the wavelength division multiplexing coupler, wherein the inverse design structure photonic integrated circuit is configured to couple the first optical signal to the fiber according to the oblique angle.

2. The optical network device of claim 1, wherein the inverse design structure of the wavelength division multiplexing coupler is configured to receive the second optical signal from a transceiver port of the fiber according to the oblique angle, and configured to couple the first optical signal from the plane where the photonic integrated circuit is located to the transceiver port of the fiber according to the oblique angle, wherein an angle range of the oblique angle is between 0° and 20°.

3. The optical network device of claim 1, wherein the inverse design structure comprises a first end, a second end, and a third end, wherein the inverse design structure is configured to diffract the first optical receiving signal to the first end of the inverse design structure, wherein the inverse design structure is configured to diffract the second optical receiving signal to the second end of the inverse design structure, wherein the inverse design structure is configured to receive the first optical signal from the third end of the inverse design structure.

4. The optical network device of claim 3, wherein the wavelength division multiplexing coupler further comprises:
a first output waveguide channel, coupled to the first end of the inverse design structure, and configured to output the first optical receiving signal;
a second output waveguide channel, coupled to the second end of the inverse design structure, and configured to output the second optical receiving signal; and
an input waveguide channel, coupled to the third end of the inverse design structure, and configured to receive the first optical signal.

5. The optical network device of claim 4, wherein the inverse design structure further comprises:
a center; and
a plurality of lattices, comprising:
a plurality of first lattice planes, arranged along a first direction from the center to the first end with a first plane wave front shape;
a plurality of second lattice planes, arranged along a second direction from the center to the second end with a second plane wave front shape; and
a plurality of third lattice planes, arranged along a third direction from the center to the third end with a third plane wave front shape.

6. The optical network device of claim 5, wherein a pore diameter of each of the plurality of lattices gradually decreases along the first direction, the second direction, and the third direction respectively.

7. The optical network device of claim 6, wherein the plurality of lattices are in a shape of a quasi-triangular mesh.

8. The optical network device of claim 4, wherein an intersection angle is formed between the first output waveguide channel and the second output waveguide channel, wherein an angle range of the intersection angle is between 80° and 110.

9. The optical network device of claim 1, wherein the packaging cap comprises:
a guide hole, located on a top of the packaging cap, and configured to guide the fiber into an accommodating space of the packaging cap so as to align the fiber with the photonic integrated circuit;
a packaging cap body, configured to connect the fiber; and
a sleeve, configured to connect a bottom of the packaging cap body with the substrate.

10. The optical network device of claim 9, further comprising:
a ferrule, between the guide hole of the packaging cap and the fiber, and configured to fix the fiber to pass through the guide hole and extend into the accommodating space of the packaging cap, so as to align the fiber with the photonic integrated circuit so that the oblique angle is formed between a transceiver port of the fiber and the normal vector of the plane where the photonic integrated circuit is located.

11. The optical network device of claim 10, wherein the fiber is configured to fix the transceiver port of the fiber to the photonic integrated circuit by a colloid, wherein the colloid comprises an optical glue.

12. The optical network device of claim 11, wherein the sleeve is combined with the substrate by a first welding method, wherein the sleeve is combined with the packaging cap body by a second welding method, wherein the first welding method comprises one of a first laser welding method and a first resistance welding method, wherein the second welding method comprises one of a second laser welding method and a second resistance welding method.

13. The optical network device of claim 1, wherein the packaging cap is combined with the substrate by a welding method, wherein the welding method comprises one of a laser welding method and a resistance welding method.

14. A method for packaging optical network device, comprising:

combining a fiber to a guide hole located at a top of a packaging cap so as to guide the fiber to extend through the guide hole to an accommodating space of the packaging cap;

aligning a transceiver port of the fiber with a photonic integrated circuit on a substrate;

fixing a normal vector of a plane where the photonic Integrated circuit is located and the transceiver port of the fiber to present an oblique angle so that the photonic integrated circuit receives and transmits at least one optical signal according to the oblique angle, comprising:

coupling a first optical signal from the plane where the photonic Integrated circuit is located to the transceiver port of the fiber according to the oblique angle by an inverse design structure of a wavelength division multiplexing coupler of the photonic integrated circuit;

receiving a second optical signal from the transceiver port of the fiber according to the oblique angle by the inverse design structure; and splitting the second optical signal into a first optical receiving signal and a second optical receiving signal by the inverse design structure; and combining the packaging cap with the substrate so that the accommodating space of the packaging cap covers the photonic integrated circuit.

15. The method for packaging optical network device of claim 14, wherein the packaging cap comprises a packaging cap body and a sleeve, wherein combining the packaging cap with the substrate so that the accommodating space of the packaging cap covers the photonic integrated circuit comprises:

combining the packaging cap body with the sleeve to form the packaging cap; and combining the packaging cap with the substrate.

16. The method for packaging optical network device of claim 15, wherein the sleeve is combined with the substrate by a welding method, wherein the welding method comprises one of a laser welding method and a resistance welding method.

17. The method for packaging optical network device of claim 14, wherein the packaging cap comprising a packaging cap body and a sleeve, wherein combining the packaging cap with the substrate so that the accommodating space of the packaging can covers the photonic integrated circuit comprising:

combining the sleeve with the substrate to surround the photonic integrated circuit; and combining the packaging cap body with the sleeve to form the packaging cap.

18. The method for packaging optical network device of claim 17, wherein the sleeve is combined with the packaging cap body by a welding method, wherein the welding method comprises one of a laser welding method and a resistance welding method.

* * * * *